United States Patent
Treat et al.

(10) Patent No.: US 10,215,043 B2
(45) Date of Patent: Feb. 26, 2019

(54) METHOD AND DEVICE FOR PISTON SEAL ANTI-ROTATION

(71) Applicant: United Technologies Corporation, Hartford, CT (US)

(72) Inventors: Christopher Treat, Manchester, CT (US); Nicholas W. Kantany, Manchester, CT (US); Andrew D. Burdick, Somers, CT (US); Michael C. Pezzetti, Jr., Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 347 days.

(21) Appl. No.: 15/052,457

(22) Filed: Feb. 24, 2016

(65) Prior Publication Data

US 2017/0241281 A1     Aug. 24, 2017

(51) Int. Cl.

| F01D 11/00 | (2006.01) |
|---|---|
| F02C 7/28 | (2006.01) |
| F16J 9/24 | (2006.01) |
| F01D 25/24 | (2006.01) |
| F16J 15/3272 | (2016.01) |

(52) U.S. Cl.
CPC .......... *F01D 11/003* (2013.01); *F01D 11/005* (2013.01); *F01D 25/246* (2013.01); *F02C 7/28* (2013.01); *F16J 9/24* (2013.01); *F16J 15/3272* (2013.01); *F05D 2220/32* (2013.01); *F05D 2230/60* (2013.01); *F05D 2240/58* (2013.01); *F05D 2260/30* (2013.01); *F05D 2260/36* (2013.01); *Y02T 50/671* (2013.01)

(58) Field of Classification Search
CPC ............... F02D 11/005; F05D 2240/55; F05D 2240/58; F02C 7/28; F16J 9/24
See application file for complete search history.

(56) References Cited

U.S. PATENT DOCUMENTS

| 3,768,817 A | 10/1973 | Daniels |
|---|---|---|
| 3,801,220 A * | 4/1974 | Beckershoff ............. F01D 5/06 415/134 |
| 4,184,689 A | 1/1980 | Brodell et al. |
| 4,540,186 A | 9/1985 | Beidler |
| 5,318,402 A | 6/1994 | Bailey et al. |
| 5,320,487 A * | 6/1994 | Walker .................... C30B 11/00 415/173.3 |
| 7,438,526 B2 | 10/2008 | Enderby |
| 7,549,845 B2 * | 6/2009 | Uwami ................. F01D 11/005 277/630 |
| 7,581,931 B2 | 9/2009 | Shaefer et al. |

(Continued)

FOREIGN PATENT DOCUMENTS

EP     0921272 A2     6/1999

OTHER PUBLICATIONS

Extended European Search Report for EP Application No. 17157485.8, dated Jul. 7, 2017, 7 pages.

*Primary Examiner* — Nicholas L Foster
(74) *Attorney, Agent, or Firm* — Kinney & Lange, P.A.

(57) ABSTRACT

A method of limiting circumferential rotation of a split-ring seal for use in a gas turbine engine includes inserting a retention block through a slot in a flange of a support structure and into a groove configured to hold a split-ring seal, and engaging an end of a split-ring seal in the groove with a surface of the retention block.

9 Claims, 6 Drawing Sheets

(56) References Cited

U.S. PATENT DOCUMENTS

| | | | |
|---|---|---|---|
| 8,246,299 B2 * | 8/2012 | Razzell | F01D 11/005 415/173.1 |
| 8,419,361 B2 | 4/2013 | Robertson | |
| 8,453,464 B2 | 6/2013 | Durocher et al. | |
| 9,127,557 B2 | 9/2015 | Davis, III et al. | |
| 9,200,519 B2 * | 12/2015 | Nereim | F01D 5/06 |
| 9,291,065 B2 | 3/2016 | Muller et al. | |
| 9,334,738 B2 * | 5/2016 | Nereim | F01D 5/06 |
| 9,347,322 B2 * | 5/2016 | Gurao | F01D 5/06 |
| 9,631,507 B2 * | 4/2017 | Gurao | F01D 11/005 |
| 9,808,889 B2 * | 11/2017 | Mitchell | B23K 31/02 |
| 9,845,698 B2 * | 12/2017 | Brooks | F01D 11/005 |
| 2006/0239814 A1 * | 10/2006 | Uwami | F01D 11/005 415/134 |
| 2006/0273524 A1 | 12/2006 | Weber et al. | |
| 2009/0148279 A1 * | 6/2009 | Shaefer | F01D 5/06 415/173.5 |
| 2009/0191050 A1 * | 7/2009 | Nereim | F01D 11/005 415/173.7 |
| 2010/0066027 A1 | 3/2010 | Vasagar | |
| 2012/0082540 A1 * | 4/2012 | Dziech | F01D 11/005 415/173.1 |
| 2014/0112766 A1 * | 4/2014 | Nereim | F01D 5/06 415/173.7 |
| 2014/0119899 A1 * | 5/2014 | Nereim | F01D 5/06 415/173.1 |
| 2014/0119900 A1 * | 5/2014 | Gurao | F01D 5/06 415/173.1 |
| 2014/0140827 A1 | 5/2014 | Hagan | |
| 2014/0255169 A1 * | 9/2014 | Muller | F01D 11/003 415/173.7 |
| 2015/0110621 A1 | 4/2015 | Saville et al. | |
| 2015/0159496 A1 | 6/2015 | Pouzet et al. | |
| 2015/0198055 A1 * | 7/2015 | Mitchell | B23K 31/02 415/110 |
| 2016/0010478 A1 * | 1/2016 | Gurao | F01D 11/005 277/312 |
| 2016/0025013 A1 * | 1/2016 | Miller | F02C 7/28 60/805 |
| 2016/0376902 A1 * | 12/2016 | Brooks | F01D 11/005 416/198 A |

\* cited by examiner

METHOD AND DEVICE FOR PISTON SEAL ANTI-ROTATION

BACKGROUND

The present application relates generally to seal assemblies, and more particularly to split-ring piston seals.

Piston seals (or piston rings) can be used in a variety of applications to create a seal between fluids of different pressures and temperatures. Piston seals can exhibit significant wear (e.g., fretting can cause narrowing of seals, as well as shortening of split-ring seals) when allowed to rotate freely in a circumferential direction. Wear is not limited to applications involving the sealing of rotating components. Piston seals applied between static, non-rotating, structures, may also exhibit wear due to rotation.

SUMMARY

In one aspect of the present invention, a method of limiting circumferential rotation of a split-ring seal for use in a gas turbine engine includes inserting a retention block through a slot in a flange of a support structure and into a groove configured to hold a split-ring seal, and engaging an end of a split-ring seal in the groove with a surface of the retention block.

In another aspect of the present invention, an anti-rotation device for limiting circumferential movement of a split-ring piston seal in a gas turbine engine includes an H-shaped retention block and a support structure configured to receive the split-ring piston seal and to retain the H-shaped retention block.

In yet another aspect of the present invention, an anti-rotation device for limiting circumferential movement of a split-ring piston seal includes a retention block. The retention block includes a first side, a first face adjacent to the first side, a stem extending outward from the first side, and a boss extending outward from the first face.

The present summary is provided only by way of example, and not limitation. Other aspects of the present disclosure will be appreciated in view of the entirety of the present disclosure, including the entire text, claims and accompanying figures.

Figure 1:
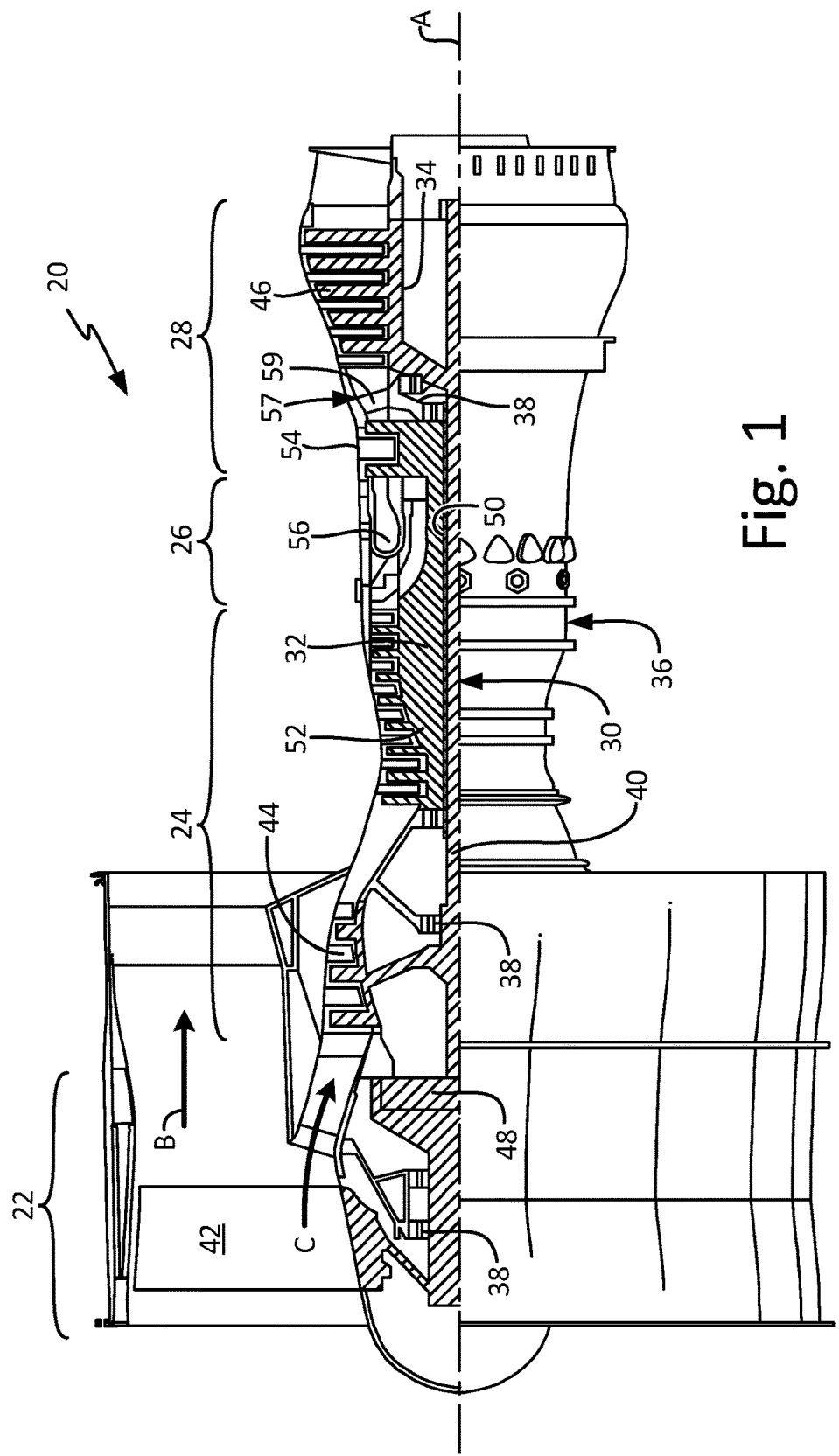
FIG. 1 is a quarter-sectional view of a gas turbine engine.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

FIG. 1 is a quarter-sectional view of a gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 57 of engine static structure 36 is arranged generally between high pressure turbine 54 and low pressure turbine 46. Mid-turbine frame 57 further supports bearing systems 38 in turbine section 28 as well as setting airflow entering low pressure turbine 46.

The core airflow C is compressed by low pressure compressor 44 then by high pressure compressor 52 mixed with fuel and ignited in combustor 56 to produce high speed exhaust gases that are then expanded through high pressure turbine 54 and low pressure turbine 46. Mid-turbine frame 57 includes airfoils/vanes 59, which are in the core airflow path and function as an inlet guide vane for low pressure turbine 46. Utilizing vanes 59 of mid-turbine frame 57 as inlet guide vanes for low pressure turbine 46 decreases the length of low pressure turbine 46 without increasing the axial length of mid-turbine frame 57. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

Figure 2:
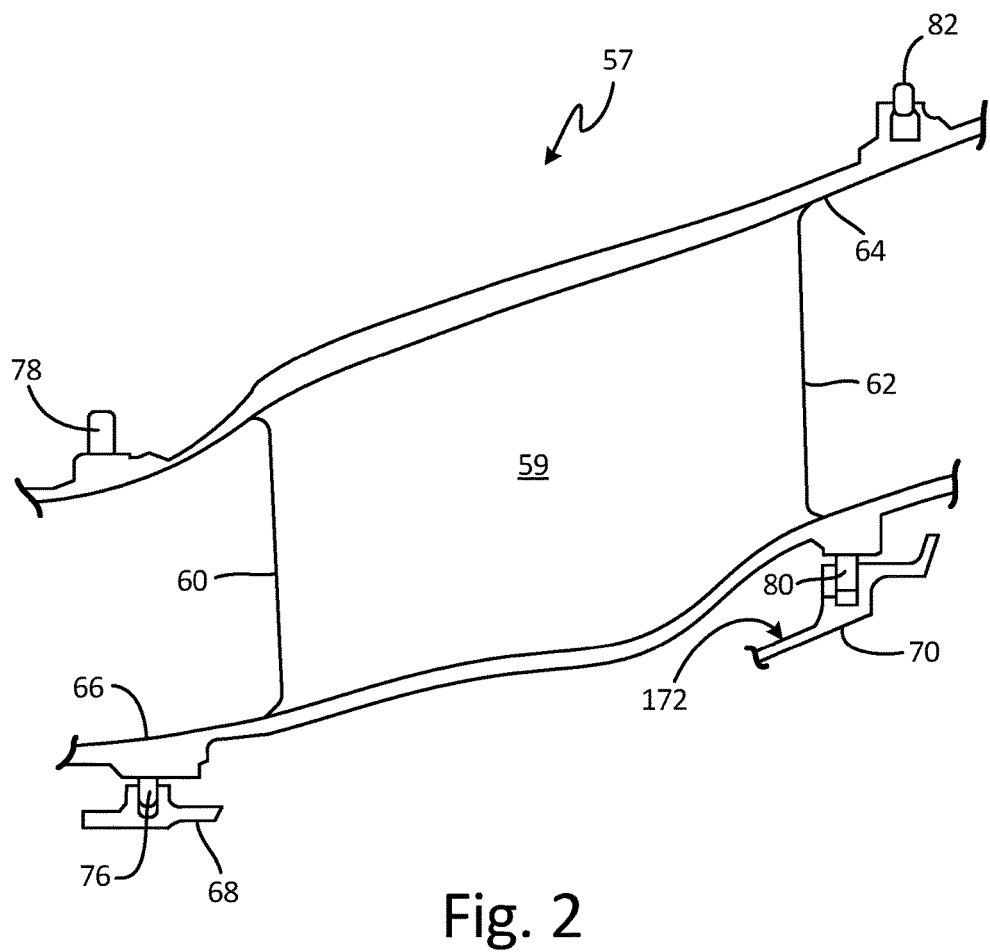
FIG. 2 is a cross-sectional view of a mid-turbine frame of the gas turbine engine.

FIG. 2 is a cross-sectional view of mid-turbine frame 57, which includes airfoils/vanes 59 (each having leading edge 60 and trailing edge 62), outer platform 64, inner platform 66, inner diameter forward seal support structure 68, inner diameter aft seal support structure 70, forward inner diameter seal 76 and outer diameter seal 78, aft inner diameter seal 80 and outer diameter seal 82. Seals 76, 78, 80, and 82 can each be split-ring piston seals. In the disclosed embodiment, seals 76, 80, and 82 can be biased outward, whereas spring 78 can be biased inward toward outer platform 64. As shown in FIG. 2, forward inner seal 76 and aft inner seal 80 can be axially retained in support structures 68 and 70, respectively, and radially retained by inner platform 66, respectively. (Seals 78 and 82 can also be axially and radially retained by adjacent structures, although not fully illustrated in FIG. 2). All seals (76, 78, 80, and 82) may exhibit substantial wear, including reduced thickness and length due to fretting, if allowed to freely rotate in a circumferential direction.

Figure 3:
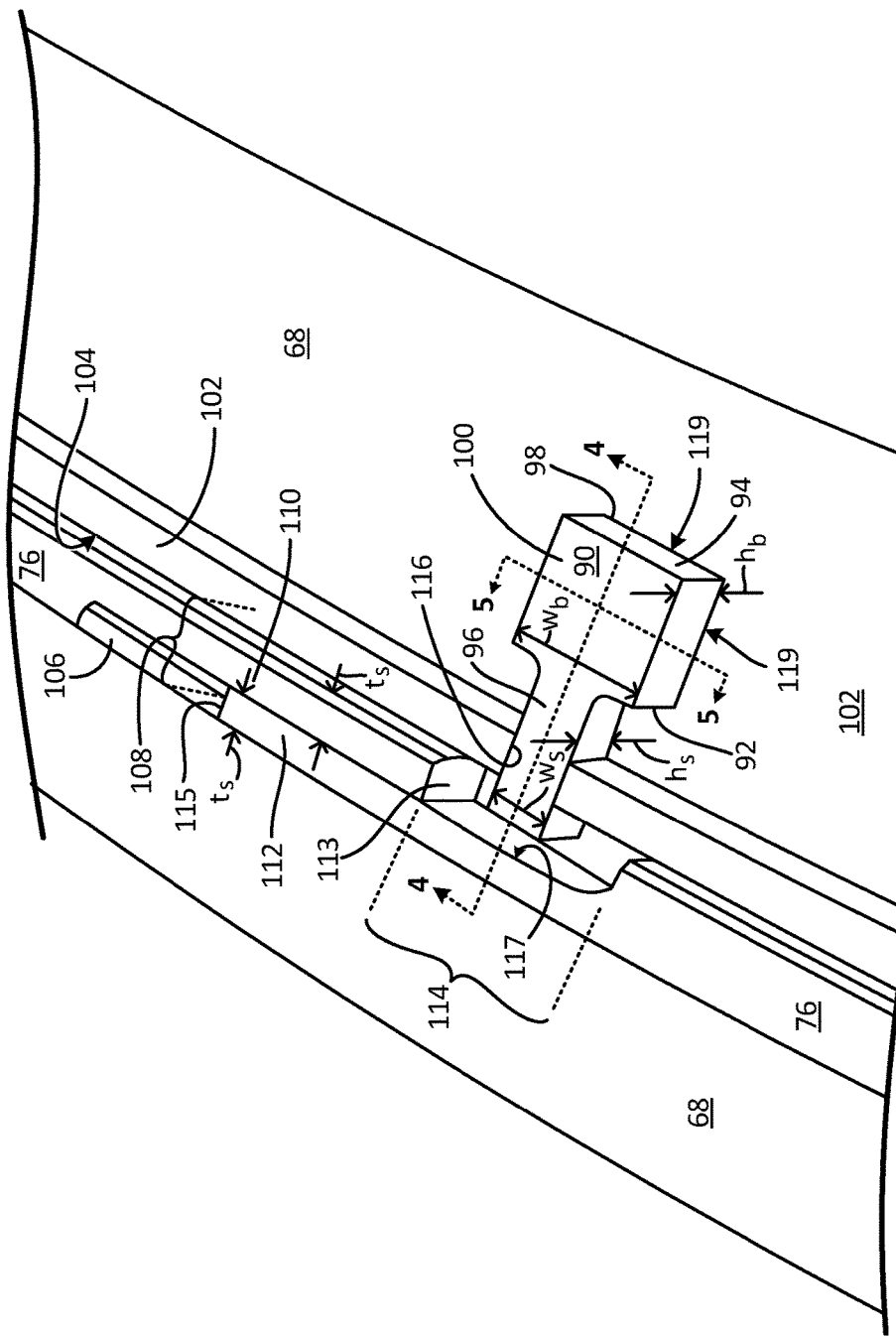
FIG. 3 is a perspective view of one embodiment of an anti-rotation seal retention block.
Figure 4:
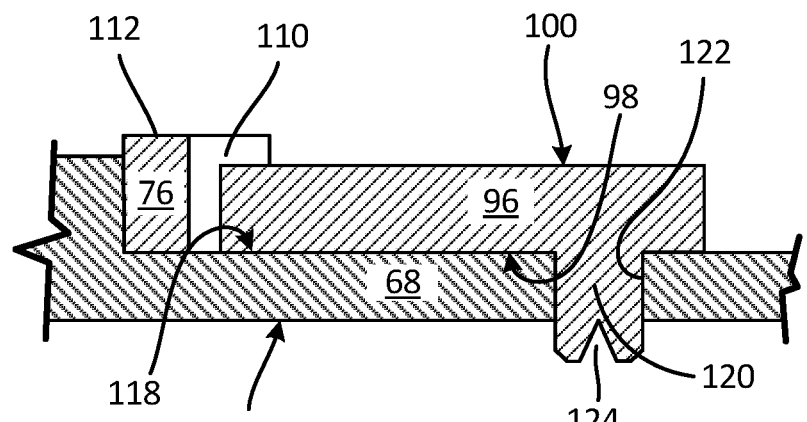
FIG. 4 is a cross-sectional view of the anti-rotation seal retention block, taken along the 4-4 line of FIG. 3.
Figure 5:
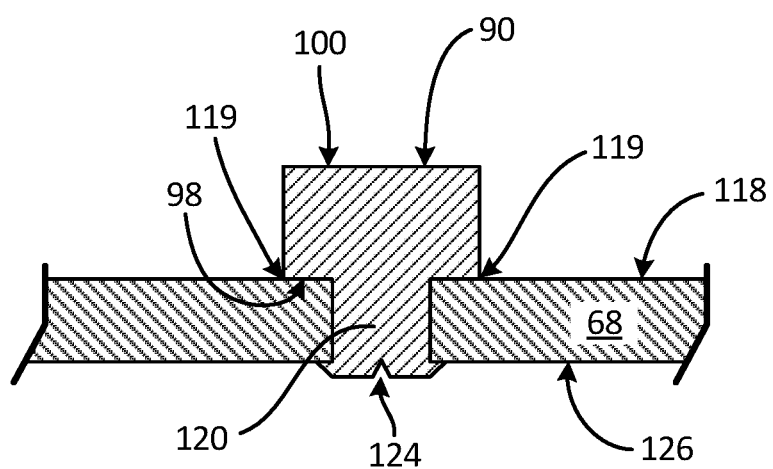
FIG. 5 is a cross-sectional view of the anti-rotation seal retention block, taken along the 5-5 line of FIG. 3.

FIGS. 3-5 show one embodiment of an anti-rotation seal retention feature and seal assembly used to limit circumferential movement of forward inner diameter seal 76. FIG. 3 is a perspective view of seal retention block 90. FIG. 4 is a cross-sectional view of seal retention block 90 taken along the 4-4 line of FIG. 3. FIG. 5 is a cross-sectional view of seal retention block 90 taken along the 5-5 line of FIG. 3. Although described with respect to forward inner diameter seal 76, it should be understood that the disclosed embodiment of retention block 90 applies equally to seals 78, 80, and 82, as well as other seal assemblies.

Seal retention block 90 can include first side 92, second side 94 located opposite first side 92, stem 96 extending outward from first side 92, first face 98, and second face 100. First and second faces 98 and 100 can be inner and outer surfaces, respectively, each being located adjacent first and second sides 92 and 94, which can be arranged at opposite lateral sides of retention block 90. Stem 96 can have a height ($h_s$) equal to a height ($h_b$) of retention bock 90, extending from first face 98 to second face 100. Stem 96 can have a width ($w_s$) less than a width ($w_b$) of seal retention block 90 and can be substantially centered along first side 92.

Support structure 68 can include flange 102, which can make up one of two walls 104 and 106, forming groove 108. Groove 108 can be configured to hold forward inner seal 76. Seal 76 can be a split ring seal having first end 110 and second end 112. First end 110 and second end 112 can each be reduced in thickness ($t_s$), such that each end 110 and 112 extends only a partial thickness of groove 108, extending from wall 104 to wall 106. While in the illustrated embodiment first and second ends 110 and 112 have equal thickness $t_s$, first and second ends 110 and 112 can have different thicknesses. The reduced thickness ($t_s$) can allow ends 110 and 112 to form a shiplap overlap within groove 108. First and second ends 110 and 112 can each be reduced in length to form end gap 114, which can extend from end surface 113 of first end 110 to a portion of second end 112 where seal 76 increases in thickness, and from end surface 115 of second end 112 to a portion of first end 110 where seal 76 increases in thickness. End gap 114 can allow seal 76 to expand due to thermal changes during operation without buckling.

Flange 102 can have slot 116, which can be aligned with end gap 114. Slot 116 can extend in a radial direction, opening at a top portion of flange 102 and extending inward. Stem 96 can extend through slot 116 and at least partially into end gap 114 to block circumferential rotation of seal 76 during operation. As shown in FIGS. 3 and 4, stem 96 can extend into end gap 114 (and groove 108, between walls 104 and 106) a distance less than the thickness $t_s$ of first end 110, such that stem 96 does not contact second end 112 along inner circumferentially extending surface 117 and cause binding upon thermal expansion of seal 76. Generally, the distance can be greater than 50% and less than 90% percent of the thickness $t_s$, and can commonly be within the range of approximately 60% to 75% of the thickness $t_s$. The distance to which stem 96 extends into end gap 114 can be limited to a distance at which stem 96 is capable of blocking circumferential rotation of seal 76 by contacting end surfaces of one or both first and second ends 110 and 112.

Stem 96 can be press fit into slot 116 in flange 102 and can be positioned such that first face 98 contacts a first outer surface 118 support structure 68 (illustrated in FIGS. 4 and 5). First outer surface 118 of support structure 68 can be oriented substantially perpendicularly to flange 102. A tack weld can be applied anywhere along the periphery of seal retention block 90 where seal retention block 90 interfaces with support structure 68 or flange 102. As shown in FIG. 3, tack weld 119 is applied along a portion of a perimeter of retention block 90 where first face 98 contacts first outer surface 118. Additionally, seal retention block 90 can include boss 120 extending outward from first face 98 (FIGS. 4 and 5). Boss 120 can provide axial and radial retention of seal retention block 90. Boss 120 can be semi-tubular. Alternatively, boss 120 can be a rivet, screw, bolt, or other suitable fastener. As shown in FIGS. 4 and 5, boss 120 can extend through hole 122 in support structure 68, such that end 124 of boss 120 protrudes through a full thickness of support structure 68 and protrudes from second surface 126 of support structure 68. As shown in FIG. 5, end 124 can be swaged to engage second surface 126, providing radial retention of seal retention block 90. The combination of press fitting stem 96 and swaging boss 120 into mating components of support structure 68, as well as applying tack weld 119, keeps seal retention block in position without the need of additional fasteners, which could add weight.

Seal retention block 90 can be easily removed and replaced if damaged. Seal retention block 90 can remain installed when seal 76 is replaced and can be installed before or after seal 76. Support structures without seal retention features may be retrofitted to accommodate seal retention block 90 by cutting a slot into a flange and hole into an adjacent support structure. The ability to retrofit existing structures eliminates the need for redesign of the support structure or seal in a manner necessary to achieve the same result. Although FIG. 2 illustrates assembly of retention block 90 on inner diameter forward support structure 68 of mid-turbine frame 57, retention block 90 may be suited for use in a variety of seal assemblies, not limited to the application of gas turbine engines. Within gas turbine engines, retention block 90 may be suited for assembly in other engine sections, including but not limited to, fan, compressor, diffuser, combustor, turbine, and exhaust case seal assemblies.

Figure 6:
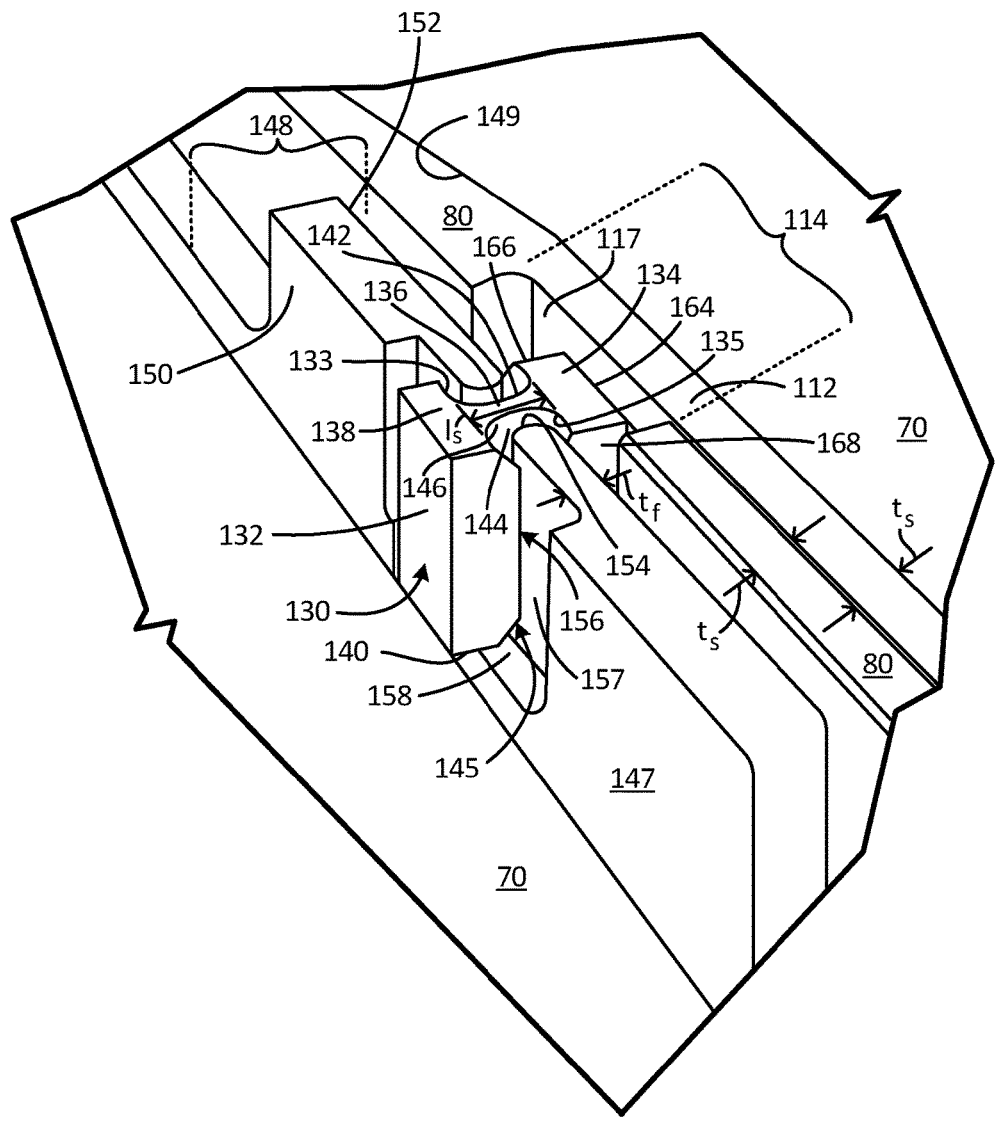
FIG. 6 is a perspective view of another embodiment of an anti-rotation seal retention block.
Figure 7:
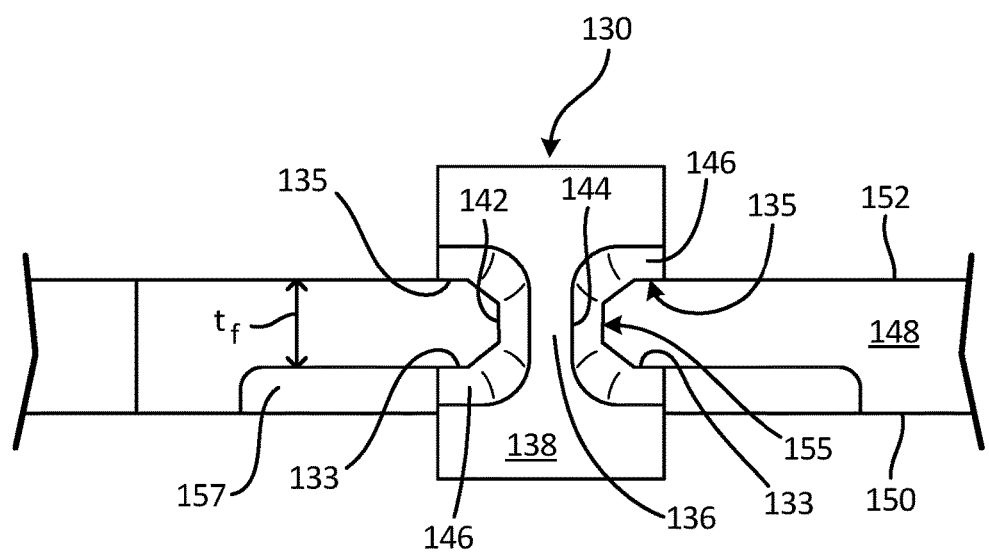
FIG. 7 is a schematic top view of the anti-rotation seal retention block of FIG. 6.

FIGS. 6 and 7 illustrate another embodiment of an anti-rotation seal retention feature. FIG. 6 is a perspective view of seal retention block 130 and seal assembly, including aft inner diameter seal support structure 70, and seal 80. Although described with respect to seal 80, it should be understood that the disclosed embodiment of retention block 130 applies equally to seals 76, 78, and 82. Similar to seal 76, seal 80 can be a split-ring seal having first end 110 and second end 112, each having reduced thickness ($t_s$), overlapping, and forming end gap 114. FIG. 7 is a schematic top view of retention block 130 and seal assembly.

Retention block 130 can be an H-shaped structure. Retention block 130 can have first portion 132 with inner surface 133, second portion 134 with inner surface 135, stem 136, first face 138, and second face 140. Stem 136 can connect first portion 132 and second portion 134 to form the H-shape. First face 138 can be located at one end of retention block 130 and can include an end section of each of first portion 132, second portion 134, and stem 136. Second face 140 can be located at an end of retention block 130 opposite to first face 138. Second face 140 can include an opposite end section of each of first portion 132, second portion 134, and stem 136. Inner surface 133 of first portion 132 and inner surface 135 of second portion 134 can adjoin first face 138 at the one end and second face 140 at the opposite end. Stem 136 can have first outer surface 142 and second outer surface 144. First and second outer surfaces 142 and 144 can each adjoin first face 138 at the one end and second face 140 at the opposite end. First and second portions 132 and 134 can be substantially equal in shape and size. A resulting symmetrically designed retention block 130 can provide for mistake-proof assembly.

Inner surfaces 133 and 135 of first and second portions 132 and 134, respectively, and first surface 142 and second surface 144 of stem 136 can each adjoin second face 140 with chamfer 145. Inner surfaces 133 and 135 and first and second surfaces 144 and 136 can also adjoin first face 138 with chamfer 146. Having chamfers 145 and 146 at either face of retention block 130 allows for mistake-proof assembly.

Aft inner diameter support structure 70 can have groove 148, bordered by flange 147 on one side and surface 149 on the opposite side, for holding seal 80. Flange 147 can have an elevated portion with first side 150 and second side 152, opposite first side 150. Although the disclosed embodiment illustrates a continuous flange with a local elevated portion, it will be understood by one skilled in the art that support structures can have local flanges or a continuous flange with constant height. Flange 147 can have slot 154 for retaining retention block 130. Slot 154 can be disposed in the radial direction, opening at a top portion of flange 147 and extending inward, and can extend generally transverse to groove 148. Stem 136 of retention block 130 can be press fit into slot 154, with retention block 130 first portion 132 positioned adjacent flange 147 first side 150 and with retention block 130 second portion 134 positioned adjacent flange 147 second side 152. A length ($l_s$) of stem 136, extending from first portion 132 to second portion 134, can be substantially equal to a thickness ($t_f$) of flange 147 (extending from first side 150 to second side 152), such that first and second portions 134 and 136 contact first and second sides 150 and 152, respectively. For added retention, tack weld 155 can be applied where first and second inner surfaces 133 and 135 of first and second portions 132 and 134, and first and second outer surfaces 142 and 144 of stem 136 adjoin first face 138 (illustrated in FIG. 7). Additional tack weld 156 can also be applied where inner surfaces 133 and 135 adjoin first and second sides 150 and 152 of flange 147. It will be understood by one skilled in the art that the placement of tack welds is not limited to the embodiments shown and that a tack weld can generally be used anywhere along the periphery retention block 130 where retention block 130 meets flange 147 or support structure 70.

As shown in FIGS. 6 and 7, the elevated portion of flange 147 can have cutout 157 where flange is reduced in thickness from first side 150. Reducing the thickness of flange 147 can remove weight from support structure 70 and reduce a size of retention block 130. The length ($l_s$) of stem 136 can be reduced to substantially match a thickness ($t_f$) of flange 147 along a section of first side 150 where flange 147 has been reduced in thickness (at cutout 157). Cutout 157 can have fillet 158 connecting a surface of cutout 157 with first side 150. Retention block 130 can have mating chamfer 145 to allow good fit between retention block 130 and flange 147.

Second portion 134 of retention block 130 can extend into groove 146 to engage seal 80 in end gap 114. Second portion 134 can extend into groove 148 a distance that is less than thickness $t_s$ of seal 80 at first end 110, such that outer surface 164 of second portion 134 does not contact second end 112 along inner circumferentially extending surface 117 and cause binding upon thermal expansion of seal 80. Similar to the previous embodiment, the distance to which second portion 134 extends into end gap 114 can be limited to a distance at which engagement surfaces 166 and 168, located adjacent outer surface 164, are capable of blocking circumferential rotation of seal 80. Generally, the distance can be greater than 50% and less than 90% percent of a thickness of seal 80, and can commonly be within the range of approximately 60% to 75% of the thickness of seal 80. Outer surface 164 and engagement surfaces 166 and 168 can each be rectangular in shape. The rectangular shape can spread out load and reduce contact stress with seal 80.

Similar to the previous embodiment, seal retention block 130 can be easily removed and replaced if damaged. Seal retention block 130 can remain installed when seal 80 is replaced and can be installed before or after seal 80. Support structures without seal retention features can be retrofitted to accommodate seal retention block 130 by cutting slot 154 into a flange of the existing support structure. The ability to retrofit existing structures eliminates the need for redesign of the support structure or seal in a manner necessary to achieve the same result. Although, FIG. 2 illustrates assembly of retention block 130 on inner diameter aft support structure 70 of mid-turbine frame 57, retention block 130 may be suited for use in a variety of seal assemblies, not limited to the application of gas turbine engines. Within gas turbine engines, retention block 130 may be suited for assembly in other engine sections, including but not limited to, fan, compressor, diffuser, combustor, turbine, and exhaust case seal assemblies. In the disclosed engine, retention block 130 is designed for assembly in multiple support structures, including support structure 68, which can be easily adapted to receive retention block 130. Unlike retention block 130, retention block 90 may require modification to be assembled in support structure 70 due to angled outer surface 172 on support structure 70 (shown in FIG. 2). It would be understood by one skilled in the art to modify retention block 90 to adequately mate with or engage an angled support surface.

Discussion of Possible Embodiments

The following are non-exclusive descriptions of possible embodiments of the present invention.

A method of limiting circumferential rotation of a split-ring seal for use in a gas turbine engine according to an exemplary embodiment of this disclosure, among other possible things includes inserting a retention block through a slot in a flange of a support structure and into a groove configured to hold a split-ring seal, and engaging an end of a split-ring seal in the groove with a surface of the retention block.

The method of the preceding paragraph can optionally include, additionally and/or alternatively, any one or more of the following features:

A further embodiment of the foregoing method can include providing axial retention of the retention block by (a) engaging first and second sides of the flange with first and second inner sides of the retention block, and/or (b) extending a boss through a portion of the support structure disposed adjacent to the flange and swaging an end of the boss to engage the support structure.

An anti-rotation device for limiting circumferential movement of a split-ring piston seal in a gas turbine engine according to an exemplary embodiment of this disclosure includes an H-shaped retention block and a support structure configured to receive the split-ring piston seal and to retain the H-shaped retention block.

The device of the preceding paragraph can optionally include, additionally and/or alternatively, any one or more of the following features:

A further embodiment of the device of the foregoing paragraph, wherein the H-shaped retention block can include a first portion, a second portion, a stem connecting the first portion and the second portion, and a first face at one end of the H-shaped retention block and a second face at an opposite end of the H-shaped retention block. The first face can include an end section of each of the first portion, the second portion, and the stem. The second face can include an opposite end section of each of the first portion, the second portion, and the stem.

A further embodiment of the device of the foregoing paragraphs, wherein the first and second portions can each comprise inner surfaces separated from one another by the stem and adjoining the first face at the one end and the second face at the opposite end, and wherein the stem can comprises opposite first and second outer surfaces each adjoining the first face at the one end and the second face at the opposite end. The inner surfaces of the first and second portions and the first and second outer surfaces of the stem can join at least one of the first and second faces with a chamfer.

A further embodiment of the device of the foregoing paragraphs, wherein the support structure can include a flange and a slot extending through the flange for receiving the stem of the retention block.

A further embodiment of the device of the foregoing paragraphs, wherein the flange can have first side and a second side opposite the first side. A section of the first side of the flange can be reduced in thickness and an inner surface of the first portion of the retention block can engage the first side of the flange along the section of the first side where the flange is reduced in thickness.

A further embodiment of the device of the foregoing paragraphs, wherein the stem can include first and second outer surfaces each adjoining the first face at the one end and the second face at the opposite end. A length of the stem, extending from the first portion to the second portion, can be substantially equal to a thickness of the flange along the section of the first side where the flange is reduced in thickness.

A further embodiment of the device of the foregoing paragraphs, wherein the stem of the retention block can be press fit into the slot of the flange.

A further embodiment of the device of the foregoing paragraphs, wherein the support structure can include a groove adjacent the flange, and wherein the split-ring seal can be disposed at least partially in the groove. The split-ring seal can have first and second ends that overlap and create an end gap. The second portion of the retention block can extend into the groove of the support structure to engage the seal in the end gap.

A further embodiment of the device of the foregoing paragraphs, wherein the first and second ends of the split-ring seal can each have a thickness that is less than a thickness along the length of the seal, and wherein the second portion of the retention block can extend into the groove a distance that is less than the thickness of the first end.

An anti-rotation device for limiting circumferential movement of a split-ring piston seal according to an exemplary embodiment of the present disclosure includes a retention block with a first side, a first face adjacent to the first side, a stem extending outward from the first side, and a boss extending outward from the first face.

The device of the preceding paragraph can optionally include, additionally and/or alternatively, any one or more of the following features:

A further embodiment of the device of the foregoing paragraphs, wherein the stem can have a height equal to a height of the retention block, extending from the first face to a second face opposite the first face, and a width that is less than a width of the retention block. The stem can be substantially centered along the first side of the retention block.

A further embodiment of the device of the foregoing paragraphs can include a flange and a slot extending through the flange for receiving the stem of the retention block.

A further embodiment of the device of the foregoing paragraphs, wherein the stem of the retention block can be press fit into the slot of the flange.

A further embodiment of the device of the foregoing paragraphs can include a groove adjacent the flange. The split-ring seal can be disposed in the groove and can have first and second ends of reduced thickness. The first and second ends can overlap and create an end gap between the first end and a portion of the second end where the seal increases in thickness. The stem of the retention block can extend through the slot of the flange and into the groove of the support structure to engage the seal in the end gap.

A further embodiment of the device of the foregoing paragraphs, wherein the stem of the retention block can extend into the groove a distance that is less than the thickness of the first end.

A further embodiment of the device of the foregoing paragraphs, wherein the support structure can include a hole for receiving the boss of the retention block.

A further embodiment of the device of the foregoing paragraphs, wherein the boss can be disposed at a right angle with respect to the stem.

A further embodiment of the device of the foregoing paragraphs, wherein the first face of the retention block can sit on a first surface of the support structure and the boss can extend through a full thickness of the support structure such that an end of the boss can protrude from a second surface of the support structure. The end of the boss can be swaged to engage the second surface of the support structure.

SUMMATION

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of limiting circumferential rotation of a split-ring seal for use in a gas turbine engine, the method comprising:
   receiving and retaining a retention block in a support structure, wherein the support structure comprises:
      a flange;
      a slot extending through the flange; and
      a groove adjacent the flange;
   wherein the retention block comprises:
      an H-shaped retention block comprising:
         a first portion;
         a second portion, wherein the second portion extends into the groove of the support structure; and
         a stem connecting the first portion and the second portion, wherein the stem is received in the slot of the support structure; and
   wherein the split-ring seal comprises:
      first and second ends that overlap and create an end gap; and
      engaging the first or second end of the split-ring seal in the groove with a surface of the second portion of the retention block.

2. The method of claim 1, further comprising:
providing axial retention of the retention block by engaging first and second sides of the flange with first and second inner sides of the retention block.

3. An anti-rotation assembly for limiting circumferential movement of a split-ring piston seal in a gas turbine engine, the assembly comprising:
   an H-shaped retention block comprising:
      a first portion;
      a second portion; and
      a stem connecting the first portion and the second portion;
   a split-ring piston seal having first and second ends that overlap and create an end gap; and
   a support structure receiving the split-ring piston seal and retaining the H-shaped retention block, the support structure comprising:
      a flange;
      a slot extending through the flange for receiving the stem of the retention block; and
      a groove adjacent the flange;
   wherein the split-ring piston seal is disposed at least partially in the groove, and wherein the second portion of the retention block extends into the groove of the support structure engages the split-ring piston seal in the end gap.

4. The anti-rotation assembly of claim 3, wherein the H-shaped retention block comprises:
   a first face at one end of the H-shaped retention block, the first face comprising an end section of each of the first portion, the second portion, and the stem; and
   a second face at an opposite end of the H-shaped retention block, the second face comprising an opposite end section of each of the first portion, the second portion, and the stem.

5. The anti-rotation assembly of claim 4, wherein the first and second portions each comprise inner surfaces separated from one another by the stem and adjoining the first face at the one end and the second face at the opposite end, and wherein the stem comprises opposite first and second outer surfaces each adjoining the first face at the one end and the second face at the opposite end, the inner surfaces of the first and second portions and the first and second outer surfaces of the stem joining at least one of the first and second faces with a chamfer.

6. The anti-rotation assembly of claim 3, wherein the flange has a first side and a second side opposite the first side, wherein a section of the first side of the flange is reduced in thickness and wherein an inner surface of the first portion of the retention block engages the first side of the flange along the section of the first side where the flange is reduced in thickness.

7. The anti-rotation assembly of claim 6, wherein the stem further comprises first and second outer surfaces each adjoining the first face at the one end and the second face at the opposite end, wherein a length of the stem, extending from the first portion to the second portion, is substantially equal to a thickness of the flange along the section of the first side where the flange is reduced in thickness.

8. The anti-rotation assembly of claim 3, wherein the stem of the retention block is press fit into the slot of the flange.

9. The anti-rotation assembly of claim 3, wherein the first and second ends of the split-ring piston seal each have a thickness that is less than a thickness along the length of the split-ring piston seal, and wherein the second portion of the retention block extends into the groove a distance that is less than the thickness of the first end.

* * * * *